March 5, 1940. C. J. MALM 2,192,196

LAMINATED SAFETY GLASS

Original Filed May 16, 1936

INVENTOR.
Carl J. Malm
BY
ATTORNEYS

Patented Mar. 5, 1940

2,192,196

UNITED STATES PATENT OFFICE 2,192,196

LAMINATED SAFETY GLASS

Carl J. Malm, Rochester, N. Y., assignor, by mesne assignments, to Eastman Kodak Company, Jersey City, N. J., a corporation of New Jersey Application May 16, 1936, Serial No. 80,123
Renewed May 2, 1939

12 Claims. (Cl. 49—92)

This application relates to the manufacture of laminated safety glass, and more particularly to a type of glass having an extremely high resistance to breakage under impact at both relatively high and relatively low temperatures.

This application is a continuation in part of my prior application Serial No. 742,732, filed September 5, 1934, now Patent No. 2,097,954.

In the manufacture of laminated glass it has been customary to cement a sheet of cellulose derivative plastic between two or more sheets of glass, thus forming a composite product which was more or less resistant to shattering upon impact. For many years the material most widely used as the inner cellulose derivative layer was cellulose nitrate, but in recent years cellulose acetate and other organic derivatives of cellulose have proved to be superior for this purpose, due to the fact that this type of cellulosic material does not tend to discolor to the same extent as does cellulose nitrate and has other advantageous properties in the manufacture of safety glass. Referring to cellulose acetate as an example of the cellulose organic derivatives which have been used in laminated glass manufacture, it has always been customary to employ a material of comparatively low viscosity and to employ a relatively small or at least moderate amount of plasticizer. For example, so far as I am aware, the highest viscosity cellulose acetate heretofore commercially employed in laminated glass has been of the order of 60–130 seconds, as measured by the so-called dropping ball method and the highest ratio of plasticizer to cellulose derivative heretofore commercially employed has been of the order of 80–85 parts plasticizer to 100 parts of cellulose derivative.

Although safety glass manufactured in accordance with these prior art methods offers good resistance to breakage by impact at ordinary temperatures, the glass becomes comparatively brittle at low or relatively low temperatures. For example, some commercial grades of safety glass are extremely brittle at temperatures around 0° F. or lower and become progressively more brittle the lower the temperature. In other words, the safety characteristics of this glass diminishes rather rapidly with a decrease in temperature and it is not, strictly speaking, safety glass, in the sense of resisting impact and shattering, when used in extremely cold climates or other places where the temperature drops below ordinary moderate atmospheric temperatures. On the other hand, this same type of glass also loses its resistance to impact at relatively high temperatures, that is, temperatures of the order of 100°–120° F. or above.

The present invention has as its principal object to provide an improved type of safety glass composed of a plurality of sheets of a cellulose derivative, such as cellulose acetate which will have a high resistance to breakage and shattering under impact at both relatively low and relatively high temperatures. A further object is to provide a type of laminated safety glass in which the inner plastic layer is composed of a material having unusual strength and the ability to hold the respective glass sheets securely together and to resist shattering even under severe impact at temperatures which would shatter the usual type of safety glass. A still further object is to provide a new type of safety glass having an inner layer composed of an improved type of cellulose ester plastic. Other objects will appear hereinafter.

These objects are accomplished by the following invention which, in its broader aspects, comprises the formation of a sheet of cellulose organic ester material of extremely high viscosity, for example, cellulose acetate, having a viscosity as determined by the dropping ball method of the order of 500 seconds to 20,000 seconds or more and containing a relatively high percentage of plasticizer, for example, 100 to 150% or more of plasticizer based on the cellulose ester; the interposing of this high viscosity highly plasticized sheet between two or more sheets of glass and joining the plastic material to the glass by means of a suitable cement. As will be apparent, the principal feature of the product of my invention is the fact that the cellulose acetate or other cellulose organic acid ester has an extremely high viscosity and is plasticized with an unusually large amount of plasticizer. When one takes into consideration the properties of cellulose esters of high viscosity, it was not to be expected that sheet materials of this kind could be employed in the manufacture of laminated glass, nor was it in any way obvious that they would give rise to the desirable properties herein described. It is also most unusual that the addition of so large an amount of plasticizer to the cellulose derivative material would not adversely effect the strength of the plastic material or would not cause it to be too plastic in nature to be useable for this purpose, and especially that it would give a product which functions satisfactorily at relatively high temperatures.

In the following examples and description I have set forth several of the preferred embodiments of my invention but they are included merely for purposes of illustration and not as a limitation thereof.

Figure 1:
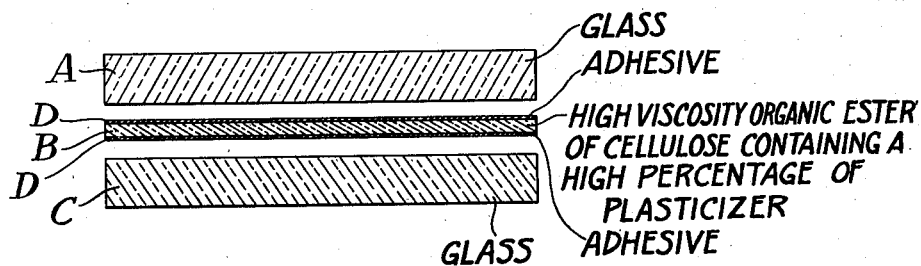
Fig. 1 illustrates the manner of assembling the cellulose derivative and glass sheets prior to welding them together into a unitary structure.

As stated, in accordance with my invention I employ for the cellulose derivative plastic an extremely high viscosity cellulose organic acid ester such as cellulose acetate. This material is particularly characterized by its extremely high viscosity. While I prefer to use a material of the order of 7000 seconds viscosity, I may employ materials having a rather wide viscosity range, for example 500–20,000 seconds or higher. The viscosities to which I refer in this application are measured by the so-called "dropping ball" method. In this method, the viscosity is the time in seconds it takes for a steel ball having a diameter of $\frac{5}{16}$ inch to fall 10 inches through a solution of the cellulose acetate maintained at 20° C., the acetate being dissolved to a concentration of 1 part of acetate to 4 parts of acetone and contained in a cylindrical vessel having a 1 inch diameter. The cellulose acetate or other high viscosity cellulose organic acid ester may be prepared in accordance with my above-mentioned Patent 2,097,954. As set forth in that application, the high viscosity esters preferably characterized by the fact that the acyl groups thereof are predominately acetyl but also include a low percentage of propionyl or butyryl, that is, a fatty acid group having three or four carbon atoms.

The sheet of cellulose acetate or other cellulose derivative may be formed in any convenient manner, such as by making up a dope by dissolving the high viscosity ester in appropriate solvents, adding the desired amount of plasticizer which in accordance with the present invention, should run from 100–150 parts of plasticizer to 100 parts of the dry acetate, and casting a sheet from this dope in known manner. Another method is to form a block of the highly plasticized cellulose ester material and to skive sheets therefrom. Probably the most satisfactory method of forming sheeting of this character is to incorporate the plasticizer with the dry cellulose ester material in the form of a molding powder and extrude the highly plasticized composition in the form of sheets. This method is to be preferred for the reason that the sheet emerges from the extruder containing no volatile solvents which have to be subsequently cured out.

The actual manufacture of the safety glass itself may be carried out in accordance with standard safety glass manufacturing practice. For example, a sheet of high viscosity-highly plasticized cellulose acetate of about .025 inch in thickness may be interposed between the surfaces of two sheets of plate glass of about ⅛ inch in thickness which have been previously cleaned and dried. A suitable cement, such as that referred to in the Watkins Patents 1,963,601 and 1,963,602 may be employed. The actual depositing of the cement may be carried out in accordance with the procedure disclosed in these patents and the parts of the glass may be assembled and cemented together as therein described.

My invention will be more readily understood by reference to the following examples which illustrate the manufacture of typical laminated safety glass sheets in accordance with preferred embodiments of the invention.

*Example I.*—Cellulose acetate having a viscosity of the order of 500 seconds, as measured by the dropping ball method, is produced in accordance with the method set forth in my copending application 742,732. The ester is then dissolved in appropriate solvents to form a dope. To this dope is added 100%, based on the weight of the cellulose acetate, of dimethyl phthalate, the whole forming a clear solution. This dope is then cast in the form of a sheet of about .025 inch in thickness in accordance with known sheet forming practise and the sheet cured to remove residual solvents. Two plane sheets of plate glass are washed and thoroughly dried. The previously formed cellulose acetate sheet is then interposed between the two glass sheets and there is applied either, to the plastic sheet, or to the inner surfaces of the glass sheets, an adhesive suitable for cementing cellulose ester sheets to laminated glass, for example, that described in the Watkins Patent 1,963,601 or in 1,963,602. The glass sheets are brought in contact with the adhesive-coated cellulose acetate sheet and subjected to a preliminary pressure in a platen press or equivalent device. After the preliminary pressing, the glass sheets are sufficiently bonded to the plastic sheet to permit handling. The composite structure is then placed in an autoclave containing a liquid which is inert with respect both to the glass and the plastic material, and the structure is there submitted to a hydrostatic pressure of about 200 lbs. per sq. inch for a period of 12–15 minutes at a temperature of about 250° F.

The resulting laminated glass is characterized by an extremely high resistance to impact, not only at ordinary temperatures, but at temperatures as low as 20° or 30° F., and as high as 100° to 130° F., or higher. As illustrating the improved characteristics of the product produced in accordance with my invention as compared to ordinary types of safety glass, a sheet of glass produced in accordance with the preceding paragraph will withstand the impact at 0° F. without shattering or breaking, of a two-pound steel ball falling through a vertical distance of up to four feet, whereas a comparable sample of ordinary safety glass in which the cellulose acetate or other plastic has a viscosity, say, of the order of 50–200 seconds, and contains not more than about 50–75% plasticizer, will be completely shattered when tested under the same conditions and, in fact, will shatter in some cases under substantially the same temperature when the ball is dropped only two feet or even one foot. Similarly, the same glass sheet will withstand the impact of the two-pound steel ball dropping from a distance up to four feet when the sheet is maintained at a temperature of 120° F., whereas ordinary safety glass of the type referred to will be broken. Both of these tests definitely establish the great superiority and increased strength and resistance to shattering under impact, at both relatively low and relatively high temperatures, of glass produced in accordance with my invention in which the cellulose acetate sheet is of high viscosity material and contains a relatively large amount of plasticizer.

*Example II.*—A plastic sheet was prepared by incorporating 150 parts by weight of benzyl benzoate with 100 parts by weight of a molding powder composed of cellulose acetate of approximately 7000 seconds viscosity prepared as previously indicated. The plasticized mixture was extruded in the form of a sheet of about .025 inch in thickness and bonded to two sheets of plate glass of about ⅛ inch in thickness, employing the same technique as described in Example I. The resulting structure exhibits the same, or improved non-shattering characteristics as that produced in accordance with Example I.

Example III.—A cellulose acetate propionate sheet was prepared substantially in accordance with the procedure outlined in Example I, the cellulose ester material having a viscosity of 20,000 seconds and the material being plasticized with 150 parts of tributyrin. This sheet, when used in laminated safety glass, gave a product which did not shatter and was wholly satisfactory when subjected to the test outlined in Example I.

Although I have found it convenient to illustrate my invention by reference to high viscosity cellulose acetate, my invention is in no sense limited to the use of this particular ester. I may, for example, use any of the single organic acid esters of cellulose such as cellulose acetate, cellulose propionate, cellulose butyrate and so on. Likewise, I may use any of the mixed organic acid esters of cellulose such as cellulose acetate propionate, cellulose acetate butyrate, and many others of similar nature. These high viscosity esters may all be prepared in accordance with the technique set forth in my above-mentioned Patent 2,097,954.

While in the above examples I have referred to the use of specific cellulose acetate plasticizers, many other plasticizers may be employed. The particular plasticizer selected will depend upon the particular ester dealt with. For making up high viscosity cellulose acetate sheets containing 100–150% of plasticizer, based on the weight of the ester, I may for example use dimethyl phthalate, di-ethyl phthalate, benzyl benzoate, butyl tartrate, ethyl adipate, ethyl phthalate, methyl adipate, tributyl phosphate, ethyl succinate, n-propyl phthalate, ethoxy ethyl adipate, methoxy ethyl adipate, β-benzoxy β-ethoxy ethyl acetate, ethoxy ethyl hydroxy butyrate, n-butyl benzoyl benzoate, n-propyl benzoyl benzoate, diaceto glyceryl benzoate. For mixed esters such as cellulose acetate propionate, cellulose acetate butyrate, I may employ tripropionin, tributyrin, and others of similar nature.

While I have also found it convenient to illustrate the manufacture of laminated glass in accordance with my invention by reference to a particular adhesive for obtaining the bonding effect between the glass and the cellulose derivative material, any suitable adhesive composition which will give a permanent bond between the glass and the cellulose derivative may be employed. The various steps in the actual manufacture of the glass may be varied rather widely in accordance with the particular conditions met with in plant practice without departing from the spirit of my invention. The chief consideration is to employ an extremely high viscosity cellulose organic acid ester in making up the sheet and at the same time to employ a high percentage of a suitable plasticizer, as I have found the shatter-resistance or impact-resistance of my product to be dependent, not only upon the use of an extremely viscous cellulose derivative, but also upon the use of a high proportion of the plasticizing agent. The high viscosity-highly plasticized sheet is characterized not only by exceptional toughness and strength, but is also characterized by a rather definite ability to stretch at low temperatures such as 20°–40° or more below zero Fahrenheit. For this purpose I have found that compositions of cellulose acetate propionate or cellulose acetate butyrate plasticized with aliphatic esters having long chains, with which the ester is compatible, exhibit a very high percentage of stretch and give excellent results.

The nature of the product produced in accordance with my invention, as well as its method of manufacture, will be more readily understood by reference to the drawing. In Fig. 1 the letters A and C designate two sheets of plate glass of approximately ⅛ inch in thickness. In making up the laminated sheet of safety glass in accordance with my invention and as set forth in the above examples, I interpose a sheet B of high viscosity cellulose acetate or other cellulose organic acid ester containing a high proportion of plasticizer between sheets A and C and coat both sides of the sheet B with an adhesive adapted for securing a high degree of adhesion between the cellulose derivative material and the glass. In Fig. 1 this adhesive is represented by the letter D, indicating a thin layer of the adhesive on both surfaces of the cellulose derivative sheet B.

Figure 2:
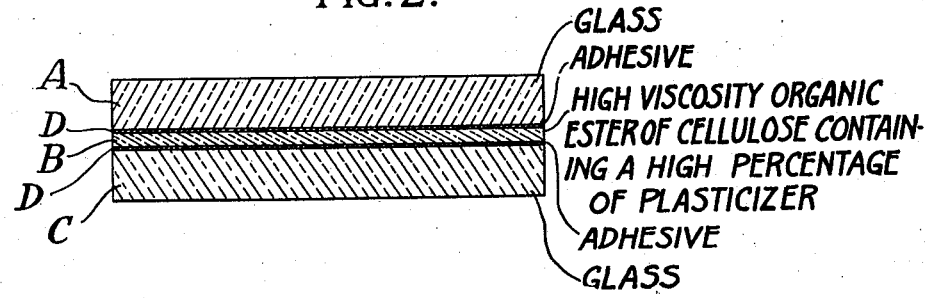
Fig. 2 illustrates the completed product in accordance with the invention.

Fig. 2 illustrates the composite product resulting from assembling the separate sheets A, B, and C of Fig. 2 and subjecting the assemblage to pressure at a moderately elevated temperature, as above described. As in Fig. 1, the letters A and C designate the glass sheet, B designates the high viscosity-highly plasticized cellulose organic acid ester sheet, while the letter D designates the two thin layers of cementing material. Of course, in actual practice the adhesive very seldom, if ever, forms a distinct layer in and of itself, but tends to merge with the cellulose derivative material or, at least, to form a layer of almost imperceptible thickness between the plastic material and the glass.

The product of my invention is susceptible of many uses. It is susceptible, not only of the uses to which ordinary laminated glass is put, such as for the windshields and windows of automobiles, the windows of airplanes and the like, but it is susceptible of use for these purposes under conditions in which the ordinary laminated glass would be entirely unsuitable. As indicated above, the term "safety glass" in the sense of designating a non-shattering product, becomes a misnomer when ordinary laminated glass is subjected to even moderately low atmospheric temperatures. When such glass encounters an atmospheric temperature of 0° F. or lower it tends to become extremely brittle and is subject to breakage and shattering, thus becoming incapable of giving the degree of protection of which it is capable at room or other moderate temperatures. My improved product on the other hand, is not only capable of giving entirely adequate protection within the ordinary range of atmospheric temperatures, but is also capable of giving practically the same protection at temperatures far below 0° F., that is, at practically any low temperature ordinarily met with in cold climates or even at extremely high altitudes.

In addition to being highly resistant to shattering under impact at low temperatures, my improved product has exceptional strength and shows marked resistance to breakage at relatively high atmospheric temperatures, for example, temperatures considerably in excess of 100° F. It is one of the unusual properties of my product that the cellulose derivative material which I employ for the plastic sheet, notwithstanding that it contains a relatively extremely high proportion of plasticizer, nevertheless, does not become sufficiently soft under these relatively high temperatures to adversely affect the strength and resistance to breakage of the product as a whole. While I offer no particular theory to explain this phenomenon of resistance to shattering at low temperatures and high strength at high temperatures, it is apparently due to the combined features of using an extremely high viscosity cellulose derivative material and a large amount of plasticizer. My work in the laminated glass field has led me to the conclusion that, neither the use of a high viscosity cellulose ester alone, nor a low viscosity ester with a high amount of plasticizer will give the results herein described, but that a combination of these two factors are necessary.

What I claim is:

1. Laminated safety glass having high resistance to shattering under impact at relatively low and relatively high atmospheric temperatures comprising sheets of glass adhesively bonded to an interposed sheet composed of high viscosity cellulose organic acid ester of at least 500 seconds viscosity and containing a high percentage of a plasticizer therefor.

2. Laminated safety glass having high resistance to shattering under impact at relatively low and relatively high atmospheric temperatures comprising sheets of glass adhesively bonded to an interposed sheet composed of high viscosity mixed cellulose organic acid ester of at least 500 seconds viscosity and containing a high percentage of a plasticizer therefor.

3. Laminated safety glass having high resistance to shattering under impact at relatively low and relatively high atmospheric temperatures comprising sheets of glass adhesively bonded to an interposed sheet composed of high viscosity cellulose acetate of at least 500 seconds viscosity and containing a high percentage of a cellulose acetate plasticizer.

4. Laminated safety glass having high resistance to shattering under impact at relatively low and relatively high atmospheric temperatures comprising sheets of glass adhesively bonded to an interposed sheet composed of high viscosity cellulose acetate containing a small amount of a fatty acid group containing 3 or 4 carbon atoms in the molecule and containing a high percentage of a plasticizer therefor.

5. Laminated safety glass having high resistance to shattering under impact at relatively low and relatively high atmospheric temperatures comprising sheets of glass adhesively bonded to an interposed sheet composed of high viscosity cellulose acetate of 500 to 20,000 seconds viscosity and containing a high percentage of a cellulose acetate plasticizer.

6. Laminated safety glass having high resistance to shattering under impact at relatively low and relatively high atmospheric temperatures comprising sheets of glass adhesively bonded to an interposed sheet composed of a cellulose organic acid ester of at least 500 seconds viscosity and containing 100–150%, based on the weight of the cellulose ester, of a plasticizer therefor.

7. Laminated safety glass having high resistance to shattering under impact at relatively low and relatively high atmospheric temperatures comprising sheets of glass adhesively bonded to an interposed sheet composed of a cellulose acetate of at least 500 seconds viscosity and containing 100–150%, based on the weight of the cellulose ester, of a plasticizer therefor.

8. Laminated safety glass having high resistance to shattering under impact at temperatures of −40° F. to 130° F., comprising sheets of glass adhesively bonded to an interposed sheet composed of a cellulose organic acid ester having a viscosity of 500 to 20,000 seconds and containing 100–150%, based on the weight of the cellulose ester, of a plasticizer therefor.

9. Laminated safety glass having high resistance to shattering under impact at temperatures of −40° F. to 130° F., comprising sheets of glass adhesively bonded to an interposed sheet composed of a cellulose acetate having a viscosity of 500 to 20,000 seconds and containing 100–150%, based on the weight of the cellulose ester, of a plasticizer therefor.

10. Laminated safety glass having high resistance to shattering under impact at temperatures of −40° F. to 130° F., comprising sheets of glass adhesively bonded to an interposed sheet composed of a cellulose acetate having a viscosity of 7000 seconds and containing 100–150%, based on the weight of the cellulose acetate, of a plasticizer therefor.

11. A clear, transparent sheet, adapted for use as the interlayer in the manufacture of laminated glass having high resistance to shattering under impact at relatively low and relatively high atmospheric temperatures, composed of cellulose acetate of 500–20,000 seconds viscosity and containing 100–150% based on the weight of the cellulose acetate of a plasticizer therefor.

12. A clear, transparent sheet, adapted for use as the interlayer in the manufacture of laminated glass having high resistance to shattering under impact at relatively low and relatively high atmospheric temperatures, composed of cellulose acetate of 500–20,000 seconds viscosity and containing 100–150% based on the weight of the cellulose acetate of tributyl phosphate.

CARL J. MALM.